United States Patent

Arakawa

Patent Number: 5,530,260
Date of Patent: Jun. 25, 1996

[54] RADIATION IMAGE READ-OUT METHOD AND APPARATUS

[75] Inventor: Satoshi Arakawa, Kanagawa-ken, Japan

[73] Assignee: Fuji Photo Film Co., Ltd., Kanagawa, Japan

[21] Appl. No.: 323,655

[22] Filed: Oct. 17, 1994

[30] Foreign Application Priority Data

Nov. 5, 1993 [JP] Japan .................................. 5-276526

[51] Int. Cl.$^6$ .................................................. G03B 42/02
[52] U.S. Cl. ........................ 250/586; 250/580; 250/584; 250/559.02; 250/559.07
[58] Field of Search .................... 250/584, 585, 250/586, 580, 559.02, 559.05, 559.06, 559.07, 559.39

[56] References Cited

U.S. PATENT DOCUMENTS

| | | |
|---|---|---|
| 4,527,060 | 7/1985 | Suzuki et al. |
| 4,864,134 | 9/1989 | Hosoi et al. ........................... 250/586 |
| 4,870,277 | 9/1989 | Saotome et al. ...................... 250/585 |
| 5,272,339 | 12/1993 | Shimura et al. ...................... 250/584 |

FOREIGN PATENT DOCUMENTS 1-13535  1/1989  Japan ..................................... 250/586

Primary Examiner—Carolyn E. Fields
Assistant Examiner—Edward J. Glick
Attorney, Agent, or Firm—Sughrue, Mion, Zinn, Macpeak & Seas

[57] ABSTRACT

As photodetectors for detecting light radiated out of a recording sheet, on which a radiation image has been recorded, during its scanning with reading light, at least a single first photodetector, which has a high detection sensitivity and is apt to undergo a saturation phenomenon at its photoelectric surface, and at least a single second photodetector, which has a low detection sensitivity and undergoes little saturation phenomenon at its photoelectric surface, are utilized. A maximum amount of the amounts of the light, which is radiated out of a region inside of each of predetermined units in the radiation image recorded on the recording sheet, is measured. Image signal components corresponding to a unit, in which the measured maximum amount of the radiated light is larger than a predetermined value, are obtained by using only the signal having been generated by the second photodetector. Image signal components corresponding to a unit, in which the measured maximum amount of the radiated light is not larger than the predetermined value, are obtained by using at least the signal having been generated by the first photodetector.

14 Claims, 1 Drawing Sheet

RADIATION IMAGE READ-OUT METHOD AND APPARATUS

BACKGROUND OF THE INVENTION

1. Field of the Invention

This invention relates to a radiation image read-out method and apparatus, wherein a recording sheet, on which a radiation image has been recorded, is scanned with reading light, light radiated out of the recording sheet during the scanning with the reading light is detected by photodetectors, each of which is provided with a photoelectric surface, and an image signal representing the radiation image is obtained from signals, which have been generated by the photodetectors.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, an X-ray image is recorded on an X-ray film having a small gamma value chosen according to the type of image processing to be carried out, the X-ray image is read out from the X-ray film and converted into an electric signal (i.e., an image signal), and the image signal is processed and then used for reproducing the X-ray image as a visible image on a photocopy, or the like. In this manner, a visible image having good image quality with high contrast, high sharpness, high graininess, or the like, can be reproduced.

Also, it has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected by a photodetector and converted into an electric image signal. The image signal is then processed and used for the reproduction of the radiation image of the object as a visible image on a recording material.

When a recording sheet, such as a stimulable phosphor sheet or X-ray film, on which a radiation image has been recorded, is scanned with the reading light, such as the stimulating rays, light radiated out of the recording sheet (i.e. light emitted by the recording sheet, light having passed through the recording sheet, or light reflected by the recording sheet) is obtained. Ordinarily, the light radiated out of the recording sheet varies over a very wide range from weak light to strong light, and therefore has a very wide range of light amount. In order for even weak radiated light to be detected with a sufficiently high accuracy, it is necessary to employ a photodetector having a sufficiently high photo detection sensitivity (hereinafter often simply referred to as the sensitivity).

The photodetectors, which are ordinarily employed in the radiation image recording and reproducing systems described above, are classified into the photodetectors, such as a photo transistor and a photodiode, which utilize the internal photoelectric effects, and the photodetectors, such as a photomultiplier, which are provided with photoelectric surfaces and utilize the photoelectric emission effects at the photoelectric surfaces. In cases where a photodetector provided with a photoelectric surface, such as a photomultiplier, is employed in the radiation image recording and reproducing systems described above, special measures are generally taken in order to enhance the sensitivity of the photodetector. For example, the photodetector of this type is ordinarily provided with a light guide member for guiding the incident light to the photoelectric surface. In such cases, the light guiding performance of the light guide member is improved, and the efficiency, with which the light is guided to the photoelectric surface, is kept as high as possible. Alternatively, a material, such as a bialkali, which has a high quantum efficiency, e.g. Sb-K-Cs, is employed for the photoelectric surface.

However, recently, it has been found that the photodetector provided with a photoelectric surface, the sensitivity of which has been enhanced in the manner described above, is apt to undergo a saturation phenomenon at the photoelectric surface, i.e. the phenomenon in which the sensitivity decreases for a certain length of time after the photodetector has detected a large amount of light. If the signal obtained from the photodetector undergoing the saturation phenomenon is used, an image signal cannot be obtained accurately.

At present, a photodetector provided with a photoelectric surface, which has a high sensitivity and undergoes little saturation phenomenon at the photoelectric surface, has not yet been known. Therefore, in cases where the photodetector provided with a photoelectric surface is used, it was very difficult to accurately obtain an image signal from a recording sheet, which radiates light in an amount varying over a very wide range from weak light to very strong light.

SUMMARY OF THE INVENTION

The primary object of the present invention is to provide a radiation image read-out method, wherein photodetectors provided with photoelectric surfaces is used, and an image signal is obtained accurately even from a recording sheet, which radiates light in an amount varying over a very wide range from weak light to very strong light.

Another object of the present invention is to provide an apparatus for carrying out the radiation image read-out method.

The present invention provides a radiation image read-out method, wherein a recording sheet, on which a radiation image has been recorded, is scanned with reading light, light radiated out of the recording sheet during the scanning with the reading light is detected by photodetectors, each of which is provided with a photoelectric surface, and an image signal representing the radiation image is obtained from signals, which have been generated by the photodetectors, the method comprising the steps of:

i) utilizing, as the photodetectors, at least a single first photodetector, which has a high detection sensitivity and is apt to undergo a saturation phenomenon at its photoelectric surface, and at least a single second photodetector, which has a low detection sensitivity and undergoes little saturation phenomenon at its photoelectric surface, ii) measuring a maximum amount of the amounts of the light radiated out of a region inside of each of predetermined units in the radiation image recorded on the recording sheet, iii) obtaining image signal components of the image signal corresponding to a unit, in which the measured maximum amount of the radiated light is larger than a predetermined value, by using only the signal having been generated by the second photodetector, and iv) obtaining image signal components of the image signal corresponding to a unit, in which the measured maximum amount of the radiated light is not larger than the predetermined value, by using at least the signal having been generated by the first photodetector.

As the first photodetector, it is possible to employ, for example, a photodetector having a very high efficiency, with which the light is guided to the photoelectric surface, or a photodetector, in which a material, such as a bialkali, having a high quantum efficiency, e.g. Sb-K-Cs, is employed for the photoelectric surface.

As the second photodetector, it is possible to employ, for example, a photodetector, wherein the efficiency, with which the light is guided to the photoelectric surface, is not very high, or a photodetector, in which a material undergoing little saturation phenomenon, such as Sb-Cs, Sb-Na-K, or Sb-Na-K-Cs, is employed for the photoelectric surface.

In the radiation image read-out method in accordance with the present invention, the measurement of the maximum amount of the amounts of the light radiated out of the region inside of each of predetermined units in the radiation image recorded on the recording sheet may be carried out when the recording sheet is being scanned with the reading light. Alternatively, the measurement of the maximum amount of the amounts of the light radiated out of the region inside of each of predetermined units in the radiation image recorded on the recording sheet may be carried out in accordance with preliminary read-out information, which is obtained from a preliminary read-out operation. Specifically, a preliminary read-out operation (hereinafter referred to as the "preliminary readout") may be carried out in order to ascertain the image input information of a radiation image recorded on a recording sheet. A visible image which can be used, in particular, for diagnostic purposes is obtained from a final read-out operation (hereinafter referred to as the "final readout"). During the preliminary readout, reading light is used which has an energy level lower than the energy level of the reading light used in the final readout. After the preliminary readout is completed, the final readout is carried out. The preliminary read-out information may be obtained with one of various preliminary read-out methods as disclosed in, for example, U.S. Pat. No. 4,527,060.

The predetermined units in the radiation image can be set appropriately such that, even if the saturation phenomenon at the photoelectric surface of the first photodetector occurs when first photodetector detects the light radiated out of the region inside of a certain unit, the first photodetector can return to the normal state when it detects the light radiated out of the region inside of the next unit. Specifically, the entire area of the radiation image may be set as a single predetermined unit. However, the scanning lines of the reading light on the recording sheet may be set as the predetermined units.

The present invention also provides a radiation image read-out apparatus comprising:

i) a scanning means for scanning a recording sheet, on which a radiation image has been recorded, with reading light, ii) photodetectors, each of which is provided with a photoelectric surface and detects light radiated out of the recording sheet during the scanning with the reading light, and iii) a signal processing means for forming an image signal, which represents the radiation image, from signals, which have been generated by the photodetectors, wherein the improvement comprises the provision of:

a) at least a single first photodetector, which has a high detection sensitivity and is apt to undergo a saturation phenomenon at its photoelectric surface, and at least a single second photodetector, which has a low detection sensitivity and undergoes little saturation phenomenon at its photoelectric surface, the first photodetector and the second photodetector together constituting the photodetectors, b) a light amount measuring means for measuring a maximum amount of the amounts of the light radiated out of a region inside of each of predetermined units in the radiation image recorded on the recording sheet, c) a judgment means for making a judgment as to whether the maximum amount of the radiated light, which has been measured with the light amount measuring means, is or is not larger than a predetermined value, and d) a selection means for selecting, in accordance with the results of the judgment made by the judgment means, whether image signal components of the image signal corresponding to each unit are to be obtained by using only the signal having been generated by the second photodetector or to be obtained by using at least the signal having been generated by the first photodetector.

With the aforesaid radiation image read-out method and apparatus in accordance with the present invention, for each of the predetermined units in the radiation image recorded on the recording sheet, the maximum amount of the amounts of the light radiated out of the region inside of the unit is measured. In cases where the maximum amount of the radiated light, which has been measured for a unit, is as large as a value that causes the saturation phenomenon at the photoelectric surface to occur in the first photodetector, the image signal components of the image signal corresponding to such a unit are obtained by using only the signal having been generated by the second photodetector, which undergoes little saturation phenomenon at its photoelectric surface. In cases where the maximum amount of the radiated light, which has been measured for a unit, is small, the image signal components of the image signal corresponding to such a unit are obtained by using at least the signal having been generated by the first photodetector, which has a high detection sensitivity.

Therefore, the image signal representing the radiation image can be obtained accurately even from a recording sheet, which radiates light in an amount varying over a very wide range from weak light to very strong light.

As for the unit, in which the measured maximum amount of the radiated light is small, the image signal components of the image signal corresponding to the unit may be obtained by using only the signal having been generated by the first photodetector. However, the image signal components of the image signal corresponding to the unit, in which the measured maximum amount of the radiated light is small, should preferably be obtained by using both the signal having been generated by the first photodetector and the signal having been generated by the second photodetector. In such cases, the signal-to-noise ratio of the image signal can be kept high.

DESCRIPTION OF THE PREFERRED EMBODIMENTS

Figure 1:
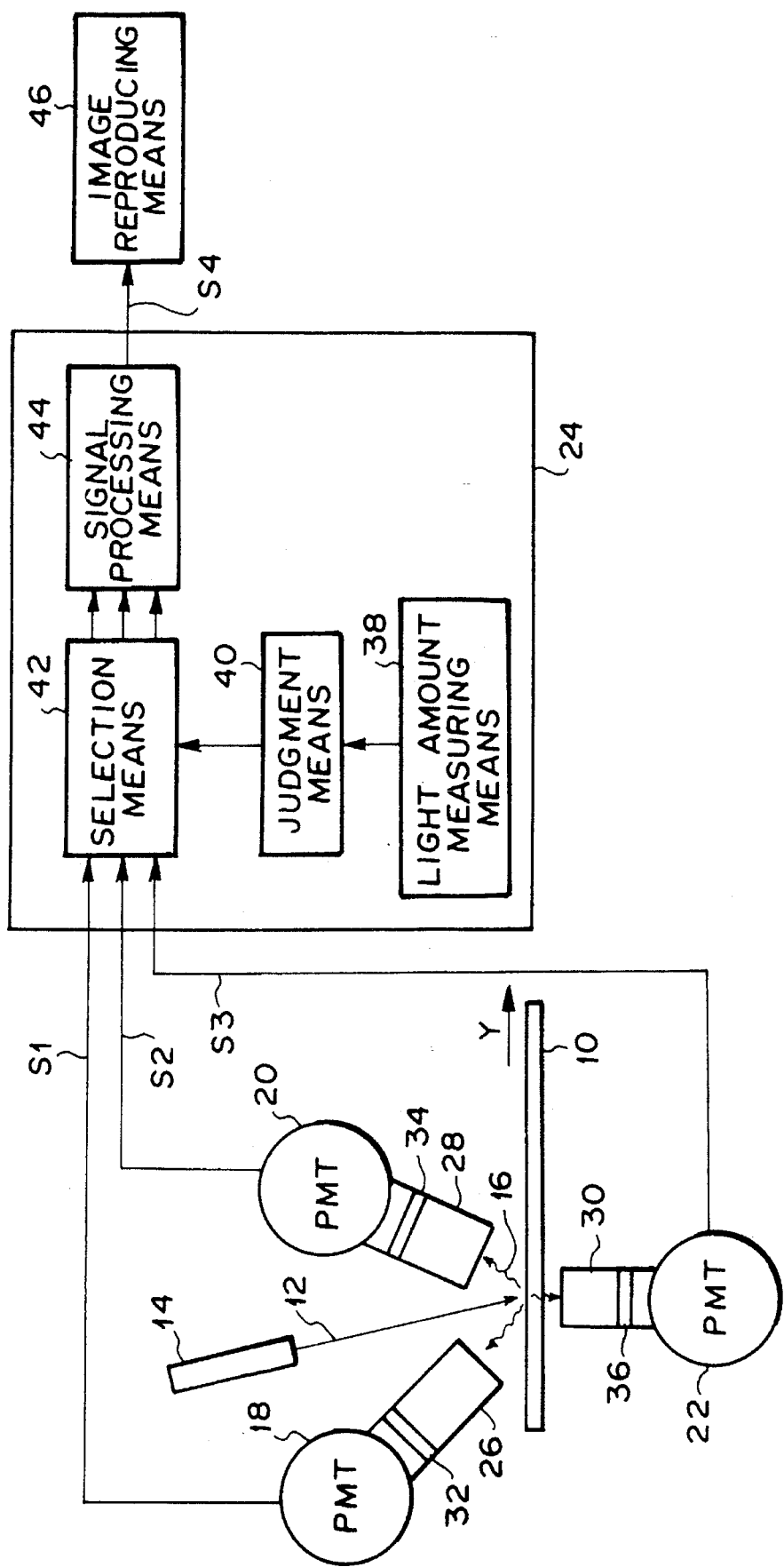
FIG. 1 is a schematic view showing an embodiment of the radiation image read-out apparatus in accordance with the present invention.

The present invention will hereinbelow be described in further detail with reference to the accompanying drawing.

FIG. 1 schematically shows an embodiment of the radiation image read-out apparatus in accordance with the present invention. The radiation image read-out apparatus shown in FIG. 1 is constructed so as to read out a radiation image having been stored on a stimulable phosphor sheet 10. The radiation image read-out apparatus comprises a conveyance means (not shown), which conveys the stimulable phosphor sheet 10 in the sub-scanning direction indicated by the arrow Y, and a laser beam source 14, which produces a laser beam 12. The laser beam source 14 serves as a scanning means for scanning the conveyed stimulable phosphor sheet 10 with the laser beam 12 in the main scanning direction, which is normal to the plane of the sheet of FIG. 1. The laser beam 12 serves as stimulating rays, which cause the stimulable phosphor sheet 10 to emit light 16 in proportion to the amount of energy stored thereon during its exposure to radiation. The radiation image read-out apparatus also comprises three photodetectors 18, 20, and 22, which detect the light 16 emitted by the portion of the stimulable phosphor sheet 10 exposed to the laser beam 12. The radiation image read-out apparatus further comprises a signal processing system 24 for processing the signals S1, S2, and S3, which are respectively generated by the photodetectors 18, 20, and 22, and thereby obtaining an image signal S4 representing the radiation image stored on the stimulable phosphor sheet 10.

The stimulable phosphor sheet 10 comprises a substrate, which is transparent with respect to the emitted light 16, and a layer of a stimulable phosphor, which is overlaid on the substrate. The stimulable phosphor is selected from the stimulable phosphors, which emits blue to green light, such as a BaFX:Eu phosphor, a BaFX:Ce phosphor, a LaOBr:Ce phosphor, and a BaXX' phosphor, wherein each of X and X' represents a halogen element. The emitted light 16 is radiated both to the side of incidence of the laser beam 12 and to the opposite side.

The photodetectors 18, 20, and 22 are respectively constituted of photomultipliers, each of which is provided with the photoelectric surface. Light guide members 26, 28, and 30 are respectively associated with the photodetectors 18, 20, and 22 such that they can efficiently guide the emitted light 16 to the photoelectric surfaces of the photodetectors 18, 20, and 22. Also, filters 32, 34, and 36, which filter out light having wavelengths within the range of wavelengths of the laser beam 12 and transmit only light having wavelengths within the range of wavelengths of the light emitted by the stimulable phosphor sheet 10, are respectively located between the photodetector 18 and the light guide member 26, between the photodetector 20 and the light guide member 28, and between the photodetector 22 and the light guide member 30. In each of the photodetectors 18 and 22, a material having a high quantum efficiency, such as Sb-K-Cs, is employed for the photoelectric surface. In the photodetector 20, a material, the quantum efficiency of which is not very high but which undergoes little saturation phenomenon, such as Sb-Cs, Sb-Na-K, or Sb-Na-K-Cs, is employed for the photoelectric surface. Also, the light guide members 26, 28, and 30 have an identical light guiding efficiency. Specifically, in this embodiment, only the materials employed for the photoelectric surfaces of the photodetectors 18, 20, and 22 are varied such that each of the photodetectors 18 and 22 can constitute the first photodetector defined in the present invention, which has a high detection sensitivity and is apt to undergo a saturation phenomenon at its photoelectric surface, and such that the photodetector 20 can constitute the second photodetector defined in the present invention, which has a low detection sensitivity and undergoes little saturation phenomenon at its photoelectric surface.

Before the stimulable phosphor sheet 10 is scanned with the laser beam 12 for obtaining the image signal S4 representing the radiation image stored on the stimulable phosphor sheet 10, a preliminary readout is carried out on the stimulable phosphor sheet 10. The signal processing system 24 is provided with a light amount measuring means 38. The light amount measuring means 38 takes each of scanning lines of the laser beam 12 on the stimulable phosphor sheet 10 as one of predetermined units. Also, in accordance with the preliminary read-out information having been obtained from the preliminary readout, the light amount measuring means 38 measures the maximum amount of the amounts of the light, which is presumed as being emitted by the region inside of each scanning line on the stimulable phosphor sheet 10 when the stimulable phosphor sheet 10 will be scanned with the laser beam 12. The preliminary readout can be carried out with one of various methods as disclosed in, for example, U.S. Pat. No. 4,527,060.

The signal processing system 24 is also provided with a judgment means 40 for making a judgment as to whether the maximum amount of the emitted light, which has been measured for each scanning line by the light amount measuring means 38, is or is not larger than a predetermined value. The signal processing system 24 is further provided with a selection means 42 for selecting at least one of the signals S1, S2, and S3, which have been generated by the photodetectors 18, 20, and 22, in accordance with the results of the judgment made by the judgment means 40. The selection means 42 feeds out the selected signals. The signal processing system 24 is still further provided with a signal processing means 44 for forming the image signal S4 from the signals, which have been selected by the selection means 42. In cases where the maximum amount of the emitted light, which has been measured for a scanning line, is judged as being larger than the predetermined value by the judgment means 40, the selection means 42 selects only the signal S2 generated by the photodetector 20, which undergoes little saturation phenomenon at its photoelectric surface, for obtaining the image signal components corresponding to the scanning line. In cases where the maximum amount of the emitted light, which has been measured for a scanning line, is judged as being not larger than the predetermined value by the judgment means 40, the selection means 42 selects all of the signals S1, S2, and S3, which have been generated by the photodetectors 18, 20, and 22, for obtaining the image signal components corresponding to the scanning line. The predetermined value described above is set such that, if the maximum amount of the emitted light is not larger than the predetermined value, no saturation phenomenon will occur even with the photodetectors 18 and 22, which are apt to undergo the saturation phenomenon at their photoelectric surfaces.

The signal processing means 44 is provided with an adder, an amplifier, an analog-to-digital converter, and the like. The signal processing means 44 carries out signal processing for, for example, appropriately compensating for the signals S1, S2, and S3, which have been generated by the photodetectors 18, 20, and 22 and have been selectively fed out from the selection means 42, for each scanning line and in accordance with the photo detection sensitivities of the photodetectors 18, 20, and 22. In this manner, the image signal S4 is obtained from the signal processing means 44. The image signal S4 obtained from the signal processing represents the radiation image stored on the stimulable phosphor sheet 10. The image signal S4 is fed into an image reproducing means 46, such as a cathode ray tube display device or a light beam scanning recording apparatus, and used for the reproduction of the radiation image as a visible image.

How the radiation image read-out method is carried out with this embodiment of the radiation image read-out apparatus will be described hereinbelow.

First, before a final readout is carried out with the radiation image read-out apparatus for obtaining a visible reproduced image, a preliminary readout is carried out on the stimulable phosphor sheet 10, on which a radiation image has been stored. During the preliminary readout, in the same manner as that in the scanning with the laser beam 12, the stimulable phosphor sheet 10 is exposed to stimulating rays, which have an energy level lower than the energy level of the laser beam 12 used in the final readout. When the stimulable phosphor sheet 10 is exposed to the stimulating rays, the exposed portion of the stimulable phosphor sheet 10 emits light, which has an intensity lower than the intensity of the emitted light 16. The light thus emitted by the stimulable phosphor sheet 10 is detected, and the preliminary read-out information is thereby obtained from the preliminary readout. In accordance with the preliminary read-out information having been obtained from the preliminary readout, the light amount measuring means 38 measures the maximum amount of the amounts of the emitted light 16, which is presumed as being emitted by the region inside of each scanning line on the stimulable phosphor sheet 10 when the stimulable phosphor sheet 10 will be scanned with the laser beam 12.

After the preliminary readout has been carried out on the stimulable phosphor sheet 10, the stimulable phosphor sheet 10 is conveyed in the sub-scanning direction indicated by the arrow Y by the conveyance means (not shown). Also, the laser beam 12 is produced by the laser beam source 14. The stimulable phosphor sheet 10 is scanned with the laser beam 12 in the main scanning direction, which is normal to the plane of the sheet of FIG. 1. In this manner, the stimulable phosphor sheet 10 is scanned in two directions with the laser beam 12. When the stimulable phosphor sheet 10 is exposed to the laser beam 12, the exposed portion of the stimulable phosphor sheet 10 emits the light 16 in proportion to the amount of energy stored thereon during its exposure to radiation. The emitted light 16 impinges upon the light guide members 26, 28, and 30, which are respectively associated with the photodetectors 18, 20, and 22. The emitted light 16, which has entered into the light guide members 26, 28, and 30, is guided inside of the light guide members 26, 28, and 30 and then received by the photoelectric surfaces of the photodetectors 18, 20, and 22.

The photodetectors 18, 20, and 22, which have received the emitted light 16, generate the photo detection signals S1, S2, and S3 in proportion to the amount of the emitted light 16. The photo detection signals S1, S2, and S3 are fed into the selection means 42 of the signal processing system 24. In cases where the amount of the emitted light 16 is larger than the aforesaid predetermined value, there is the risk that the saturation phenomenon occurs with the photoelectric surfaces of the photodetectors 18 and 22, which have received the emitted light 16, the detection sensitivities of the photodetectors 18 and 22 become low, and thereafter the photodetectors 18 and 22 cannot accurately generate the photo detection signals S1 and S3 for a certain length of time. On the other hand, the photodetector 20, which undergoes little saturation phenomenon at its photoelectric surface, can accurately generate the photo detection signal S2 even after it has received the emitted light 16 in an amount larger than the predetermined value. However, the detection sensitivity of the photodetector 20 is low, and therefore there is the risk that the photodetector 20 cannot generate a signal with a sufficiently high accuracy when the amount of the emitted light 16 impinging upon the photodetector 20 is small.

As described above, in accordance with the preliminary read-out information having been obtained from the preliminary readout, the light amount measuring means 38 of the signal processing system 24 has already measured the maximum amount of the amounts of the emitted light 16, which is emitted by the region inside of each scanning line on the stimulable phosphor sheet 10 when the stimulable phosphor sheet 10 is scanned with the laser beam 12. Also, in accordance with the results of the measurement having been carried out by the light amount measuring means 38, the judgment means 40 has already made a judgment as to whether the maximum amount of the emitted light 16, which has been measured for each scanning line by the light amount measuring means 38, is or is not larger than the predetermined value. The selection means 42, which has received the signals S1, S2, and S3 from the photodetectors 18, 20, and 22, selects at least one signal from the signals S1, S2, and S3 in accordance with the results of the judgment made by the judgment means 40 and feeds out the selected signal. Specifically, in cases where the maximum amount of the emitted light 16, which has been measured for a scanning line, is judged as being larger than the predetermined value by the judgment means 40, the selection means 42 selects only the signal S2 generated by the photodetector 20, which does not have the possibility of undergoing the saturation phenomenon at its photoelectric surface, from the received signals S1, S2, and S3 and feeds the selected signal S2 into the signal processing means 44. In cases where the maximum amount of the emitted light, which has been measured for a scanning line, is judged as being not larger than the predetermined value by the judgment means 40, the selection means 42 selects all of the received signals S1, S2, and S3 and feeds them into the signal processing means 44. The signal processing means 44 compensates for the selected signals for each scanning line and in accordance with the photo detection sensitivities of the photodetectors which generated the selected signals. Also, the signal processing means 44 carries out other necessary kinds of image processing on the selected signals. In this manner, the image signal S4 is obtained from the signal processing means 44. The image signal S4 is fed into the image reproducing means 46 and used for the reproduction of the radiation image as a visible image.

As described above, in this embodiment, the maximum amount of the emitted light is measured for each of the scanning lines of the laser beam 12 on the stimulable phosphor sheet 10. As for a scanning line, for which the measured maximum amount of the emitted light is larger than the predetermined value, the image signal components of the image signal corresponding to the scanning line are obtained by using only the signal S2 having been generated by the photodetector 20, which does not have the possibility of undergoing the saturation phenomenon at its photoelectric surface. As for a scanning line, for which the measured maximum amount of the emitted light is not larger than the predetermined value, the image signal components of the image signal corresponding to the scanning line are obtained by using all of the signals S1, S2, and S3 generated by the photodetectors 18, 20, and 22. Therefore, the image signal representing the radiation image can be obtained accurately even from a stimulable phosphor sheet 10, which emits the light 16 in an amount varying over a very wide range from weak light to very strong light.

As for the scanning line, for which the measured maximum amount of the emitted light 16 is not larger than the predetermined value, the image signal components of the image signal corresponding to the scanning line may be obtained by using only the signals S1 and S3, which have been generated by the photodetectors 18 and 22, or by using only either one of the signals S1 and S3. However, the image signal components of the image signal corresponding to the scanning line, for which the measured maximum amount of the emitted light 16 is not larger than the predetermined value, should preferably be obtained by using all of the signals S1, S2, and S3 generated by the photodetectors 18, 20 and 22. In such cases, the signal-to-noise ratio of the image signal can be kept high.

It should be understood that the radiation image read-out method and apparatus in accordance with the present invention are not limited to the embodiment described above and can be embodied in various other ways.

For example, in the embodiment described above, the maximum amount of the emitted light 16 is measured for each of the scanning lines in accordance with the preliminary read-out information. Alternatively, the measurement may be carried out during the final readout. Also, in the embodiment described above, the selection of whether the image signal is to be obtained by using only the signal S2 generated by the photodetector 20 or is to be obtained by using all of the signals S1, S2, and S3 generated by the photodetectors 18, 20, and 22 is carried out for each of the scanning lines. Alternatively, a group of a plurality of scanning lines may be taken as a single unit, and the selection may be carried out for each of such groups of the scanning lines. However, if the unit, for which the maximum amount of the emitted light 16 is measured, is very large, the region, for which the image signal is obtained by using only the signal S2 generated by the photodetector 20 having a low photo detection sensitivity, will become very broad. In such cases, if many portions, which emits only the weak light, are contained in such a region, the risk that the image signal cannot be obtained accurately will increase. Therefore, it is necessary for the unit to be determined appropriately.

Also, in the embodiment described above, the first photodetector and the second photodetector defined in the present invention are constituted by employing different materials for the photoelectric surfaces. Alternatively, an identical material (e.g. Sb-K-Cs) may be employed for the photoelectric surfaces, and only the efficiency, with which the light is guided by the light guide member, may be varied for different photodetectors. The photodetector, for which the light guiding efficiency is high, may be constituted as the first photodetector, and the photodetector, for which the light guiding efficiency is low, may be constituted as the second photodetector.

Further, in the embodiment described above, the emitted light 16 is detected from the two surfaces of the stimulable phosphor sheet 10. The radiation image read-out method and apparatus in accordance with the present invention are also applicable when the emitted light is detected only from one surface of a stimulable phosphor sheet.

The radiation image read-out method and apparatus in accordance with the present invention are further applicable when a radiation image recorded on a recording sheet, such as X-ray photographic film, other than the stimulable phosphor sheet is read out.

What is claimed is:

1. A radiation image read-out method, wherein a recording sheet, on which a radiation image has been recorded, is scanned with reading light, light radiated out of the recording sheet during the scanning with the reading light is detected by photodetectors, each of which is provided with a photoelectric surface, and an image signal representing the radiation image is obtained from signals, which have been generated by the photodetectors, the method comprising the steps of:
i) utilizing, as the photodetectors, at least a single first photodetector, which has a high detection sensitivity and is apt to undergo a saturation phenomenon at its photoelectric surface, and at least a single second photodetector, which has a low detection sensitivity and undergoes little saturation phenomenon at its photoelectric surface,
ii) measuring a maximum amount of the light radiated from each of predetermined units of the radiation image recorded on the recording sheet,
iii) obtaining image signal components of the image signal corresponding to a unit, in which the measured maximum amount of the radiated light is larger than a predetermined value, by using only the signal having been generated by said second photodetector, and
iv) obtaining image signal components of the image signal corresponding to a unit, in which the measured maximum amount of the radiated light is not larger than said predetermined value, by using at least the signal having been generated by said first photodetector.

2. A radiation image read-out method as defined in claim 1, wherein the measurement of the maximum amount of the light radiated from each of the predetermined units is carried out when the recording sheet is being scanned with the reading light.

3. A radiation image read-out method as defined in claim 1, wherein the measurement of the maximum amount of the light radiated from each of the predetermined units is carried out in accordance with preliminary read-out information, which is obtained from a preliminary read-out operation.

4. A radiation image read-out method as defined in claim 1, wherein scanning lines of the reading light on the recording sheet are respectively set as the predetermined units, and the signal, which is used to obtain said image signal components of the image signal, is processed for each scanning line and in accordance with the detection sensitivity of the photodetector which has generated said signal, to generate said image signal components of the image signal.

5. A radiation image read-out method as defined in claim 1, wherein the recording sheet is a stimulable phosphor sheet, on which the radiation image has been stored, and the reading light is stimulating rays, which cause the stimulable phosphor sheet to emit light in proportion to the amount of energy stored thereon during its exposure to radiation.

6. A radiation image read-out method as defined in claim 5, wherein the stimulating rays are a laser beam.

7. A radiation image read-out method as defined, in claim 1, wherein the recording sheet is photographic film.

8. A radiation image read-out apparatus comprising:
i) scanning means for scanning a recording sheet, on which a radiation image has been recorded, with reading light, ii) at least a single first photodetector, which has a high detection density sensitivity and is apt to undergo a saturation phenomenon at its photoelectric surface, and at least a single second photodetector, which has a low detection sensitivity and undergoes little saturation phenomenon at its photoelectric surface, said first photodetector and said second photodetector each detecting light radiated out of the recording sheet during the scanning with the reading light, and iii signal processing means for forming an image signal, which represents the radiation image, from signals, which have been generated by the photodetectors, comprising:

a) light amount measuring means for measuring a maximum amount of the light radiated from each of predetermined units in the radiation image recorded on the recording sheet, b) judgment means for making a judgment as to whether the maximum amount of the radiated light, which has been measured with said light amount measuring means, is or is not larger than a predetermined value, and c) selection means for selecting, in accordance with the results of the judgment made by said judgment means, whether image signal components of the image signal corresponding to each unit are to be obtained by using only the signal having been generated by said second photodetector or are to be obtained by using at least the signal having been generated by said first photodetector.

9. A radiation image read-out apparatus as defined in claim 8, wherein said light amount measuring means carries out the measurement of the maximum amount of the radiated light when the recording sheet is being scanned with the reading light.

10. A radiation image read-out apparatus as defined in claim 8, wherein said light amount measuring means carries out the measurement of the maximum amount of the radiated light in accordance with preliminary read-out information, which is obtained from a preliminary read-out operation.

11. A radiation image read-out apparatus as defined in claim 8, wherein scanning lines of the reading light on the recording sheet are respectively set as the predetermined units, and the signal processing means processes the signal, which is used to obtain said image signal components of the image signal, for each scanning line and in accordance with the detection sensitivity of the photodetector which has generated said signal, to generate said image signal components of the image signal.

12. A radiation image read-out apparatus as defined in claim 8, wherein the recording sheet is a stimulable phosphor sheet, on which the radiation image has been stored, and the reading light is stimulating rays, which cause the stimulable phosphor sheet to emit light in proportion to the amount of energy stored thereon during its exposure to radiation.

13. A radiation image read-out apparatus as defined in claim 12, wherein the stimulating rays are a laser beam.

14. A radiation image read-out apparatus as defined in claim 8, wherein the recording sheet is photographic film.

* * * * *